United States Patent [19]
Csendes

[11] Patent Number: 5,826,807
[45] Date of Patent: Oct. 27, 1998

[54] METHOD AND APPARATUS FOR COMMINUTING OF SOLID PARTICLES

[76] Inventor: Ernest Csendes, 514 Marquette St., Pacific Palisades, Calif. 90272

[21] Appl. No.: 987,092

[22] Filed: Dec. 8, 1997

Related U.S. Application Data

[63] Continuation-in-part of Ser. No. 423,326, Apr. 17, 1995, Pat. No. 5,695,130.

[51] Int. Cl.$^6$ ............................. B02C 19/12; B02C 23/24
[52] U.S. Cl. ........................... 241/19; 241/24.31; 241/47; 241/56; 241/78; 241/79.1; 241/79.3; 241/162
[58] Field of Search .................................... 241/19, 24.31, 241/48, 52, 56, 78, 79.1, 79.3, 154, 161, 162, 47

[56] References Cited

U.S. PATENT DOCUMENTS

| | | | |
|---|---|---|---|
| 911,913 | 2/1909 | Snyder et al. | 241/162 X |
| 1,524,651 | 2/1925 | Hapgood | 241/162 X |
| 2,752,097 | 6/1956 | Lecher . | |
| 4,690,338 | 9/1987 | Sayler et al. | 241/56 |
| 4,747,550 | 5/1988 | Jackering | 241/55 |
| 5,280,857 | 1/1994 | Reichner | 241/5 |
| 5,695,130 | 12/1997 | Csendes | 241/19 |
| 5,732,894 | 3/1998 | Sheahan | 241/56 |

*Primary Examiner*—John M. Husar
*Attorney, Agent, or Firm*—Edward A. Sokolski

[57] ABSTRACT

A cylindrical vessel has a drive shaft rotatably mounted therein and extending along substantially the entire longitudinal extent thereof. This drive shaft is rotatably driven by a motor at a speed of 3,000–10,000 rpm. The output of a roller mill or the like having particles of the order of −200 mesh to be further comminuted, which may be of coal or other minerals, are fed into the vessel. Connected to the shaft and rotatably driven therewith is a centrifugal compressor fan. This fan with additional air intake to the vessel provides a high velocity air curtain which suspends the particles and drives them upwardly. Mounted above the compressor and rotatably driven by the drive shaft are a plurality of semi-permeable screens which comminute the particles to bring them to a superfine state. Particles which are not comminuted to a superfine state are repelled by the screens for further comminution. Fully comminuted particles are passed through an aperture in a fixed plate and fed to collecting cyclones which collect these particles.

11 Claims, 6 Drawing Sheets

METHOD AND APPARATUS FOR COMMINUTING OF SOLID PARTICLES

This application is a continuation in part of my application Ser. No. 08/423,326 filed Apr. 17, 1995 now U.S. Pat. No. 5,695,130 for a Method and Apparatus for Dry Grinding of Solids.

BACKGROUND OF THE INVENTION

1. Field of the Invention

This invention relates to a method and apparatus for comminuting fine particles and more particularly to such a method and apparatus which converts such fine particles to a superfine state.

2. Description of the Related Art

Superfine coal (−325- to −400 mesh) is desirable for use as a feed stock for boilers to enhance the rate of combustion of the slower burning coals and further to reduce the NOx emission in the flu gases. Superfine industrial minerals are in demand as fillers, pigments and ingredients of building materials. The availability of such superfine materials is limited due to the inefficiency of the impact mills used to grind particles into a superfine condition and the high costs associated with the current production of such materials.

Impact mills are used extensively in the prior art for such purposes as the fine grinding of coal feeds for boilers used in electric power generating plants. Typical such prior art roller mills include the Raymond Roller Mill fabricated by ABB Raymond Co. and the B&W Pulverizer produced by Babcock and Wilcox Co. Typically, such roller mills have 70% outputs of −200 mesh.

Impact mills are available which grind to −325 mesh, such mills employing the physical impacting of the feed particles on the machinery parts to effect attritioning and vortexing. This end result is achieved in the Hurricane Mill of ABB Raymond Co. by means of fast rotating plates having vertical vanes and in the TAS Mill by means of peripheral hammers with vortexing being created in the space between adjacent rotating plates and attritioning being accomplished at the periphery of the plates adjacent to the mill casing. Pin mills and Impact mills with attritioning in combination with vortexing are also used with fast rotating plates having vertical beater bars.

These prior art devices have the disadvantages of high maintenance costs, high energy consumption and the difficulty of scaling these equipments up for higher production. In the present invention, semi-permeable screens are used to convert the output of impact mills into superfine powders at relatively low energy costs by employing the efficiency of communition by means of vertical spiral vortexes.

In my application Ser. No. 08/423,326 now U.S. Pat. No. 5,695,130 of which the present application is a continuation in part, a grinding system is described in which rotating screens with wide mesh openings are first used to comminute the material through spiral vortexes and such comminuted material is then fed to circular vortexes formed between rotating discs and stationary plates where the final grinding of the particulate material is accomplished and the final comminuted material is separated from the gas streams by centrifugal fans. The system and method of the present invention applies the basic technology of my prior patent application in implementing the superfine grinding of the already comminuted output of a device such as an impact mill, except that it does not employ rotating discs located in the central aperture of stationary plates as in the device of my prior application.

SUMMARY OF THE INVENTION

The device and method of the present invention involves the employment of a series of high speed rotating semi-permeable screens to form vertical spiral vortexes for comminuting particulate material, which has already been comminuted, into super fine particles. The particles being comminuted are propelled upwardly and suspended on an air curtain by means of a centrifugal compressor fan operating in conjunction with an air intake.

In implementing the above indicated operation, a cylindrical vessel having inlets near the bottom and outlets near the top has a drive shaft running from the bottom to the top. The drive shaft is driven at high speeds (3,000–10,000 rpm) by means of a drive motor. Comminuted particles to be further comminuted to a super-fine state are fed into an inlet near the bottom of the vessel from a comminuting device such as a roller mill with compressed air being fed into the vessel. These particles and the air are driven by a centrifugal compressor fan connected to the drive shaft so that such particles are floated on the air curtain thus provided and driven upwardly. Particles which are "oversized" are fed back to the roller mill for recycling. The other particles are conveyed to a series of fast rotating semi-permeable screens, driven by the drive shaft, where they are exposed to powerful spiral vortexes which reduce such particles by air erosion to a "superfine" size (−400 to −500 mesh). Such superfine particles are exited from the top portion of the vessel to collecting cyclones by means of centrifugal fans driven by the drive shaft.

In a second embodiment, rotating louvers are installed above the centrifugal compressor fan, the louver assembly being rotatably driven by the drive shaft. The louvers eliminate oversize particles from the stream by driving them through a feed recycle duct back to the ball mill or other particle source to be further comminuted.

It is therefore an object of this invention to provide a method and apparatus for economically and efficiently comminuting fine particles to superfine condition.

It is a further object of this invention to provide a superfine particulate fuel for use in enhancing the rate of combustion of slower burning fuels.

Other objects of the invention will become apparent in view of the following description taken in connection with the accompanying drawings.

DETAILED DESCRIPTION OF THE INVENTION

Figure 1:
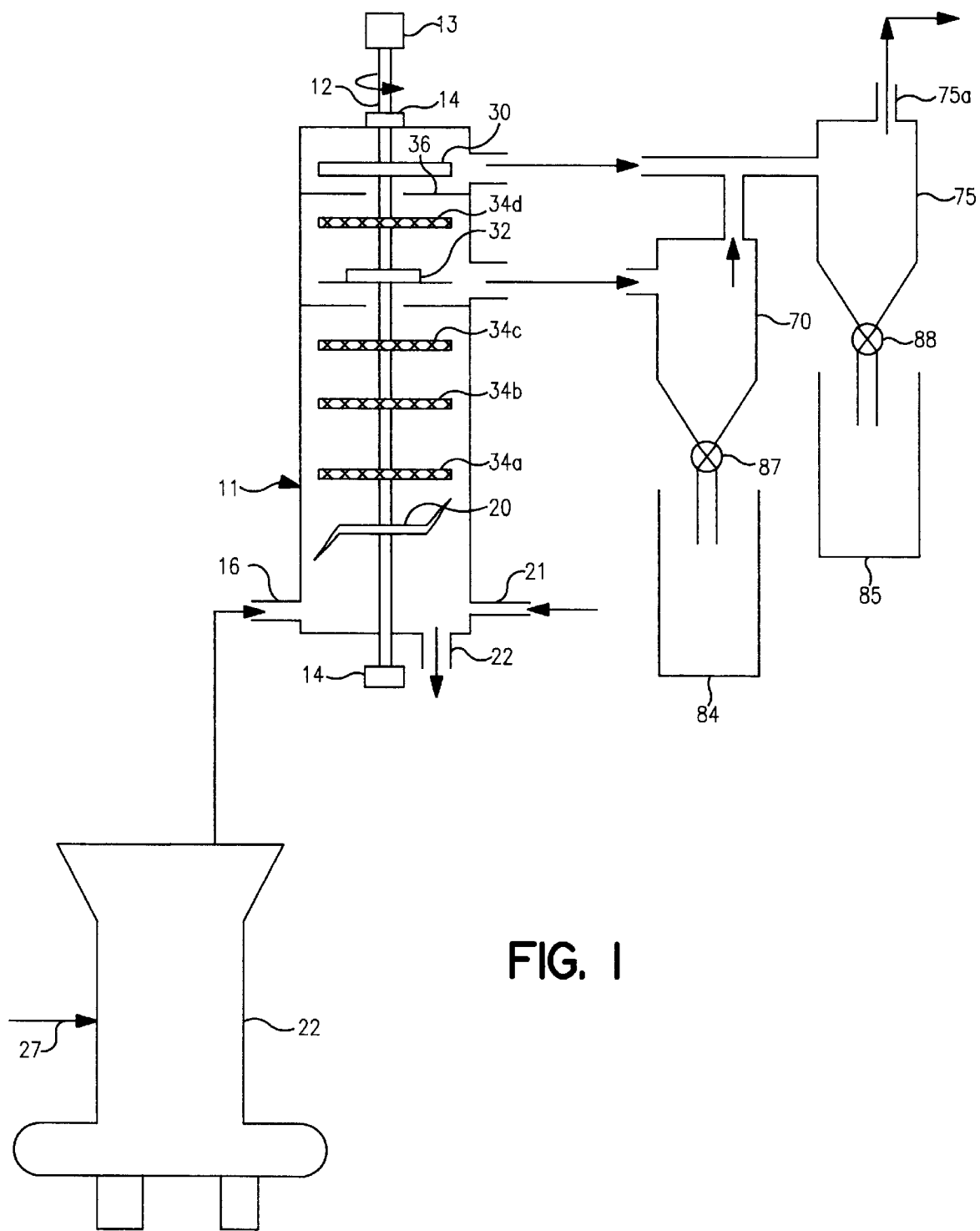
FIG. 1 is a schematic drawings illustrating a preferred embodiment of the invention.
Figure 2:
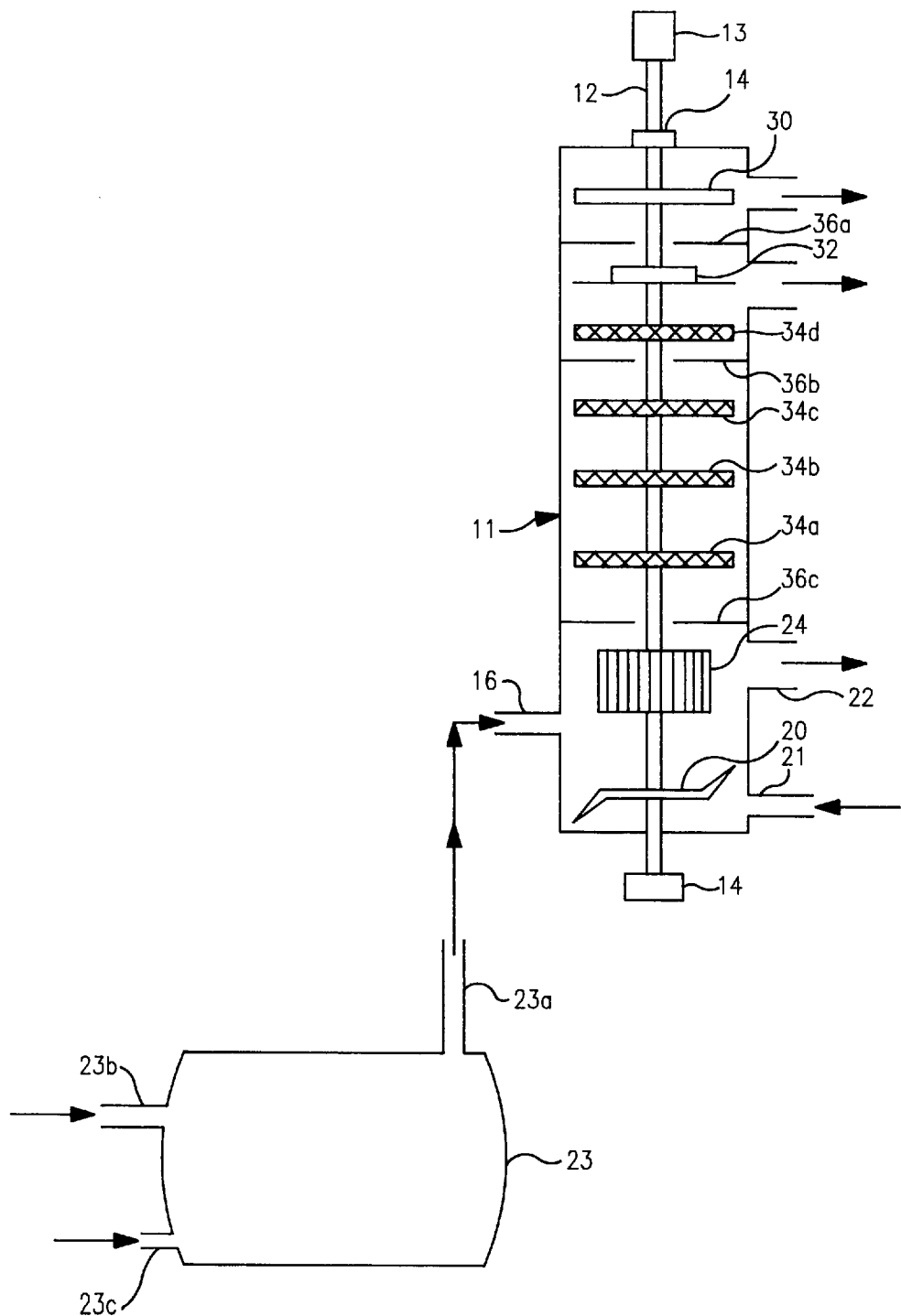
FIG. 2 is a schematic drawing illustrating a second embodiment of the invention.

Referring now to FIGS. 1,4,5 and 8–10, a preferred embodiment of the invention is illustrated.

Vessel 11 is cylindrical in form and has an inlet 16 through which comminuted particles to be further comminuted to super fine condition are fed from roller mill 23, the particles in roller mill 23 being of the order of −200 mesh. Drive shaft 12 is mounted for rotation within the vessel on bearings 14 and is rotatably driven by motor 13 at a speed of 3000–8000 rpm.

Attached to shaft 12 for rotation therewith are centrifugal compressor fan 20, semipermeable screens 34a–34d, and centrifugal eliminating fans 30 and 32.

Centrifugal compressor fan 20 provides an upwardly lifting curtain of gas which suspends the particles fed into the vessel with the aid of additional air intake fed into the vessel through inlet 21 with an air velocity of 2,000–7,000 cf/min.

Figure 4:
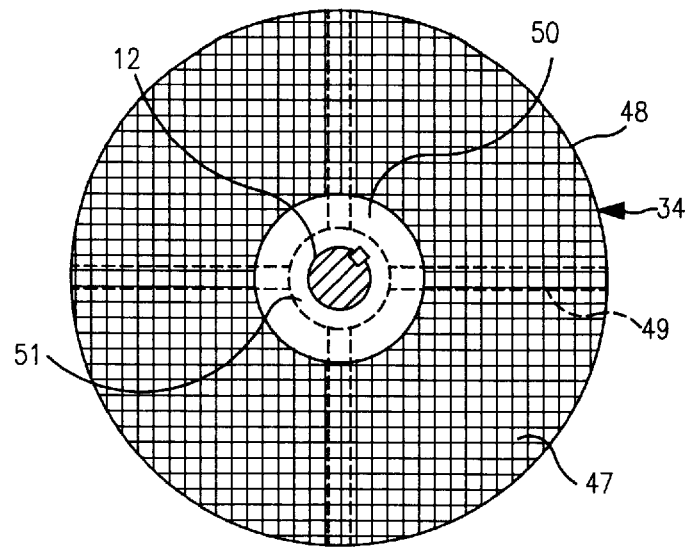
FIG. 4 is a top plan view of one of the semipermeable screens used in the preferred embodiment.
Figure 5:
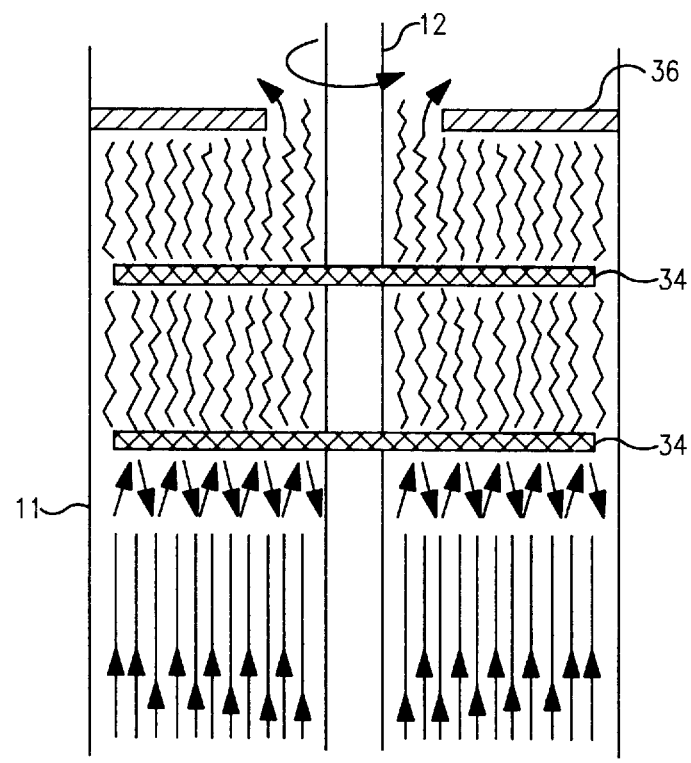
FIG. 5 is a schematic view illustrating the operation of the preferred embodiment.

The upwardly moving particles successively strike against semipermeable means formed by high speed rotating screen members 34a–34d. One of these screens is shown in FIG. 4 and in the preferred embodiment is formed by an abrasion resistant steel screen 47 having mesh openings of 4–10 mesh. The screen element is supported in holder ring 48 and reinforced by radial reinforcing rods 49. The center of the screen member has a deflector disc 50 and a central hub 51 with a keyway for connection to the drive shaft 12. The particles are exposed to powerful spiral vortexes by the screen members and are reduced in size by the air erosion to −400 to −500 mesh. This operation is illustrated in FIG. 5.

Figure 9:
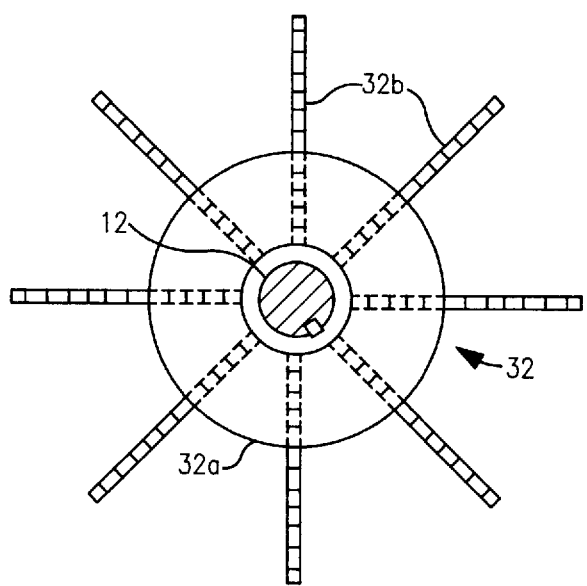
FIG. 9 is a top plan view of one of the centrifugal expelling fans of the preferred embodiment.
Figure 10:
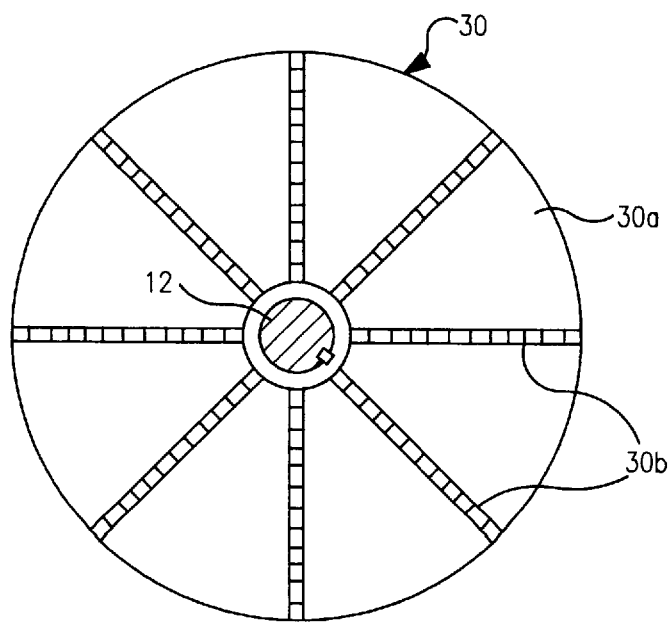
FIG. 10 is a top plan view of a second centrifugal expelling fan of the preferred embodiment.

Expelling fans 30 and 32 expel the super fine comminuted particles from the vessel to cyclone classifiers 70 and 75. Fan 30 has a cover disc 30a and vertical vanes 30b while fan 32 has a cover disc 32a and vertical vanes 32b as shown in FIGS. 10 and 9 respectively. Particles of the order of −325 mesh are expelled to cyclone 70 by fan 32 while the still finer particles of the order of −400 to −500 mesh are passed through the central aperture formed in fixed plate 36. Plate 36 can best be seen in FIG. 8.

The cyclonic classifier consists of two cyclones 70 and 75. The cyclones operate to separate the microparticles from the gas stream as described in my application Ser. No. 08/423, 326 The particles are collected in containers 84 and 85 at the bottom of cyclones 70 and 75 respectively with a coarser fraction in container 84 and a finer fraction in container 85. Rotary locks 87 and 88 are provided in the cyclones to control the passage of the micronized particles therefrom.

Oversize particles fall to the bottom of the vessel and are recycled back to roller mill 23 from outlet 22 through line 27.

Figure 6:
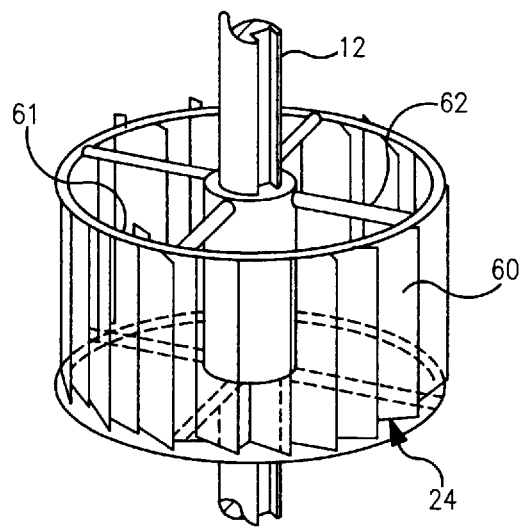
FIG. 6 is a schematic view in perspective illustrating the rotating louver of the preferred embodiment.
Figure 7:
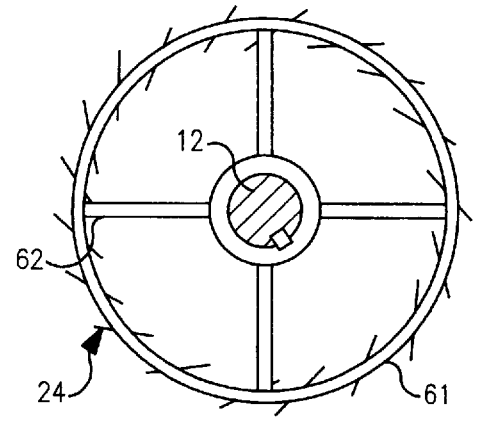
FIG. 7 is a top plan view of the rotating louver of FIG. 6.
Figure 8:
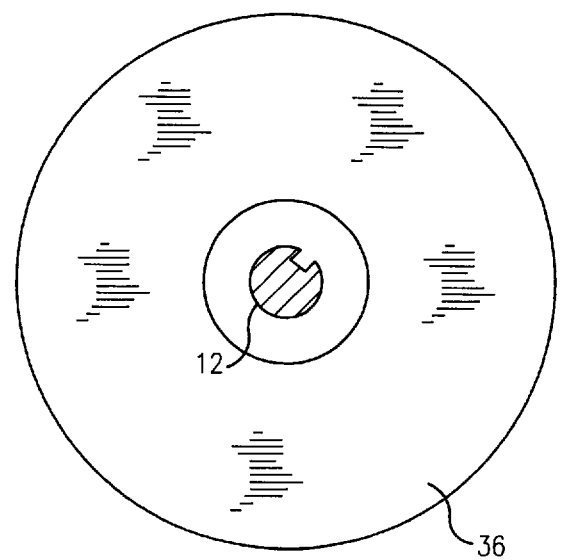
FIG. 8 is a top plan view illustrating a fixed plate having a central aperture which is used in conducting particles towards the top of the vessel in the preferred embodiment.

Referring to FIGS. 2, and 4–10, a second embodiment of the invention is illustrated. This embodiment is generally similar to the first and is used to comminute particles from a ball mill. Like parts to those of the first embodiment are identified by the same numerals. The product stream of ball mill 23, which contains suspended particles of −300 to −325 mesh is fed from outlet 23a to the inlet 16 of vessel 11. As for the prior embodiment vessel 11 has a rotatably driven shaft 12 which drives screens 34a–34d, centrifugal compressor fan 20, and expelling fans 30 and 32. Additionally included in this embodiment are rotating louvers 24 which are driven by the shaft. As in the previous embodiment, the particles are suspended and repressurized by means of centrifugal compressor fan 20 and the pressurized air intake through inlet 21. The ascending particle stream encounters rotating louvers 24 which eliminates oversize particles by driving them through outlet 22 back to inlet 23b of ball mill 23 for recycling. As shown in FIGS. 6 and 7, louvers 24 are formed with a holder ring 61 and radial reinforcing rods 62 to provide structural support for blades 60.

The finer particles are carried by the air stream through the central aperture of stationary plate 36c to rotating screens 34a–34d where they are comminuted in the same manner as in the first embodiment to a superfine state. As for the first embodiment, the comminuted superfine particles are fed to cyclones(not shown) for collection.

Figure 3:
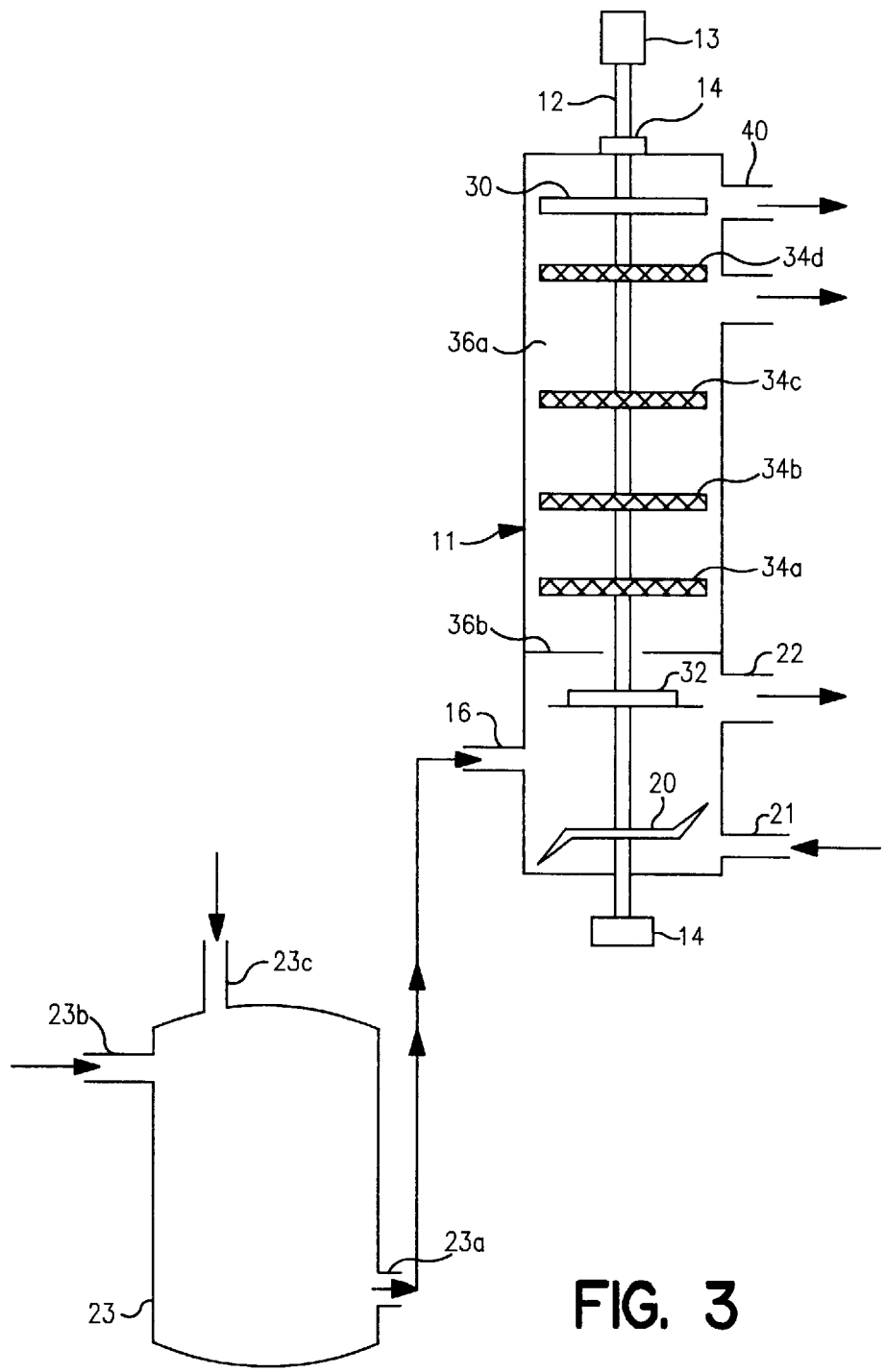
FIG. 3 is a schematic drawing illustrating a third embodiment of the invention.

Referring now to FIG. 3, a further embodiment of the invention for use with an impact mill is illustrated. This embodiment is similar to the previous embodiment except that rather than employing a louver for expelling product for recycling, centrifugal fan 32 is employed for this purpose. Also, in this embodiment a single outlet 40 for feeding the superfine particles to a single cyclone is employed.

While the invention has been described and illustrated in detail, it is to be clearly understood that this is intended by way of illustration and example only and not by way of limitation, the scope of the invention being only by the terms of the following claims.

I claim:

1. A device for further comminuting already comminuted particles to produce super fine particles comprising:
   a vessel;
   means for feeding said comminuted particles into said vessel;
   centrifugal compression fan means mounted for rotation in said vessel for forming an uplifting gas curtain for suspending said particles;
   a plurality of high speed rotation screens for comminuting said particles mounted for rotation in said vessel;
   means for rotatably driving said compression fan means and said high speed rotating screens;
   cyclonic classifier means for collecting the comminuted particles; and
   means in said vessel for driving said comminuted particles into said cyclonic classifier means.

2. The device of claim 1 wherein said screens and said fan means are rotated at 3,000–8000 rpm.

3. The device of claim 1 wherein said comminuted particles are fed to said vessel from a roller mill.

4. The device of claim 1 wherein said comminuted particles are fed to said vessel from a ball mill.

5. The device of claim 1 wherein said comminuted particles are fed to said vessel from an impact mill.

6. The device of claim 1 and additionally including louver means for driving oversize particles from said vessel for recycling, said louver means being rotatably driven by said driving means.

7. A device for comminuting already comminuted particles to produce super fine particles comprising:
   a cylindrical vessel having outlets near the upper end thereof;
   means for feeding said particles into said vessel;
   a drive shaft rotatably mounted in said vessel;
   means for rotatably driving said drive shaft;
   a plurality of screens connected to said drive shaft for rotation therewith, said screens being spaced from each other in opposing relationship;

a compressor fan connected to said shaft for rotation therewith, said compressor fan being positioned in said vessel to drive the particles upwardly through said screens;

cyclonic classifier means for separating microparticles from gas in which they are carried; and first and second centrifugal fans connected to said shaft for rotation therewith, said first fan being positioned opposite a first one of the outlets of said vessel to drive the comminuted particles and gas carrying said particles through said first one of said outlets to said cyclonic classifier means, said second fan being positioned opposite a second one of the outlets of the chamber to drive microparticles and gas through said second one of said outlets to said cyclonic classifier means.

8. The device of claim 7 wherein the drive shaft is rotated at a speed of 3,000–8,000 rpm.

9. The device of claim 7 wherein the mesh of the screens is 6–10 mesh.

10. A device for further comminuting particles to produce super fine particles comprising:

a vertically mounted vessel devoid of any rotating circular solid plates;

means for feeding said comminuted particles into said vessel;

centrifugal compression fan means mounted for rotation in said vessel for forming a pressurized vertically uplifting high velocity gas stream for suspending said particles in said gas stream;

means for creating vertical spiral gas vortexes and cavitation in said high velocity gaseous medium, said comminuting means being mounted for rotation in said vessel for comminuting said suspended particles;

means for rotatably driving said compression fan means and said comminuting means thereby creating said vortexes and said cavitation in the pressurized high velocity gas medium;

cyclonic classifier means for collecting the comminuted super fine particles; and means in said vessel for driving said comminuted particles suspended in the high velocity pressurized gas stream into said cyclonic classifier.

11. A method for further comminuting particles already comminuted to a super fine state comprising the steps of:

vertically and upwardly feeding said particles into a pressurized high velocity gas stream located in a vessel unobstructed by rotating circular plates;

driving said particles and said high velocity gas stream vertically upward so that they are suspended in said vessel;

forming vertical spiral gas vortexes and cavitation in the high velocity compressed gases in said vessel;

driving said particles through said high velocity vertical spiral gas vortexes to effect super fine comminution thereof; and feeding the super fine comminuted particles into a cyclone to separate said particles from the high velocity pressurized gas stream.

\* \* \* \* \*